J. L. HOWARD.

Stovepipe Damper.

No. 46,670.

Patented March 7, 1865.

Witnesses
M. M. Livingston
C. L. Topliff

Inventor
James L. Howard

UNITED STATES PATENT OFFICE.

JAMES L. HOWARD, OF HARTFORD, CONNECTICUT.

STOVE-PIPE DAMPER.

Specification forming part of Letters Patent No. 46,670, dated March 7, 1865.

*To all whom it may concern:*

Be it known that I, JAMES L. HOWARD, of Hartford, in the county of Hartford and State of Connecticut, have invented a new and useful Improvement in Stove Pipe Dampers; and I do hereby declare that the following is a full, clear, and exact description thereof, which will enable others skilled in the art to make and use the same, reference being had to the accompanying drawings, forming part of this specification, in which—

Figure 1:
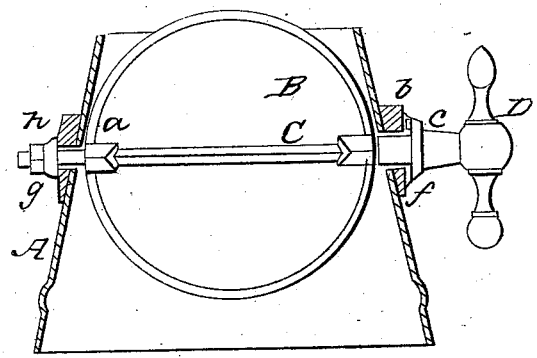
Figure 2:
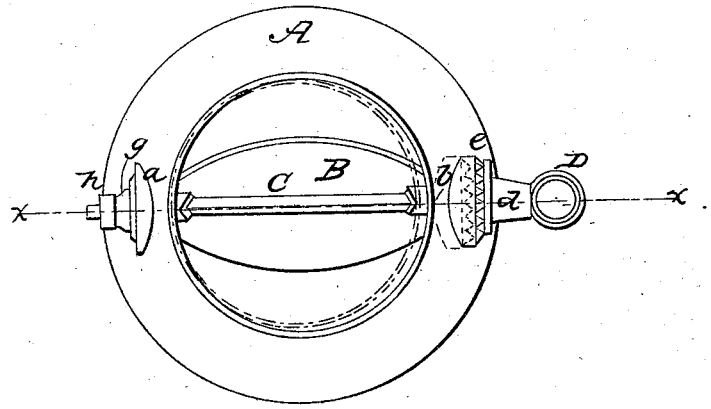

Figure 1 is an axial section of a piece of stove-pipe to which my damper is applied, the line of section being indicated by the letter $x$, Fig. 2. Fig. 2 is a plan view of the said pipe.

Similar letters of reference indicate like parts.

This invention consists in a novel mode of applying a damper to a stove-pipe, wherein the elasticity of the pipe is employed to keep the damper in any desired position, and its flexibility is employed for the purpose of releasing it in order to take a new position.

A is a short piece of a sheet-iron stove-pipe, made, in this example, of taper or conical form; but it may be cylindrical in outline.

B is an ordinary circular damper, which operates by throttling the draft through the pipe in the ordinary way.

C is the axis of the damper, to which it is rigidly secured, so that they rotate together. The axis C passes diametrically through the walls of the pipe, and extends beyond them on each side, being supported in proper bearings, $a$ and $b$, which are bolted or otherwise fixed on the sides of the pipe. The right-hand end of the axis C has a handle, D, which is made in the form of an index, whose position is to be so adjusted on the axis C as that the longitudinal axis of the said index shall always coincide with the plane of the damper B, so as to indicate its position. The left-hand end of the axis C is held up to the bearing $a$ by means of a nut, $h$, and a washer, $g$, and the opposite end has a collar, $f$, which comes in contact with the bearing $b$. The outer face of the bearing $b$ is corrugated, so as to form a series of indentations or teeth, $e$, about the opening in it through which the axis C passes, and the collar $f$ has a projection, $c$, which falls between the said teeth or indentations. I have shown only one projection, $c$, on the collar $f$, but there may be two or more, and they should be placed diametrically opposite to each other. In applying the damper to a pipe, the nut $h$ should be turned until the collar $f$ is drawn up snugly to the end of the bearing $b$, with its projection $c$ fitting into the grooves of the indentations $e$, but not so snugly as to cause any flexure of the sides of the pipe.

The operation of the damper is as follows: When it is desired to rotate the damper to a new position, I seize the index D and draw it forward with a moderate degree of force, or push it backward. Since the material of the pipe will allow it to bend, the pipe will be slightly flattened, or, in other words, its diameter will be shortened on the line of the axis C of the damper, as shown in red outline in Fig. 2, when, by suddenly rotating the index, the projections on the collar will be slipped over one or more of the ridges or teeth $e$, and so bring the damper to a new position, in which the elasticity of the pipe will retain it.

It is obvious that the damper by this mode of construction will be held secure against being turned to a new position by the jostling or disturbance of the pipe, or from the effect of such jars and vibrations as stove-pipes and dampers are subjected to in cars and other structures in motion. Much inconvenience has been experienced in railroad-cars from this cause, and no remedy hitherto proposed for the accidental and untimely rotation of stove-pipe dampers in cars has been successful in preventing it, so far as I know; but I believe that the construction herein set forth will prevent the displacement of dampers in such situations.

Instead of teeth $e$ and projecting fingers or detents for locking the damper, the friction of the collar $f$ against the end of the bearing $b$, or the friction of any part of the axis C against the sides of the pipe, may be used for that purpose.

I claim as new and desire to secure by Letters Patent—

1. Retaining the dampers of stove pipes in any desired position by means of the elasticity of the pipe, substantially as above described.

2. Releasing the damper or its axis from the indentations $e$, or other device for holding the damper in place, by shortening the diameter of the pipe in the line of the axis of the damper, substantially as described.

JAMES L. HOWARD.

Witnesses:
 M. M. LIVINGSTON,
 C. L. TOPLIFF.